(12) United States Patent
Kaye et al.

(10) Patent No.: US 11,498,694 B2
(45) Date of Patent: Nov. 15, 2022

(54) ACTIVE INFRARED PREDICTION UTILIZING FIBER OPTIC NETWORK

(71) Applicant: LOCKHEED MARTIN CORPORATION, Bethesda, MD (US)

(72) Inventors: Jordan Alex Kaye, Shelton, CT (US); Alexander Quinn Weintraub, Wilton, CT (US); Jeffrey K. Parkhurst, Meriden, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 618 days.

(21) Appl. No.: 16/548,089

(22) Filed: Aug. 22, 2019

(65) Prior Publication Data

US 2021/0053697 A1 Feb. 25, 2021

(51) Int. Cl.
*G01D 5/26* (2006.01)
*B64D 45/00* (2006.01)
*G01K 11/3206* (2021.01)

(52) U.S. Cl.
CPC ............ *B64D 45/00* (2013.01); *G01D 5/268* (2013.01); *G01K 11/3206* (2013.01)

(58) Field of Classification Search
None
See application file for complete search history.

(56) References Cited

U.S. PATENT DOCUMENTS

| 5,029,977 | A  | * | 7/1991  | Wheeler ............... G01M 11/086 |
|           |    |   |         | 73/800                             |
| 5,484,121 | A  |   | 1/1996  | Padawer et al.                     |
| 5,896,191 | A  |   | 4/1999  | Beier et al.                       |
| 2017/0336268 | A1 | * | 11/2017 | Wilson .................... G01K 11/32 |
| 2018/0100776 | A1 |   | 4/2018  | Bernus et al.                      |
| 2020/0049414 | A1 | * | 2/2020  | Veto ........................ F03D 80/60 |
| 2020/0213012 | A1 | * | 7/2020  | Laughlin ................ H04B 10/50 |

FOREIGN PATENT DOCUMENTS

CN 103837333 A 6/2014

* cited by examiner

*Primary Examiner* — Chad H Smith
(74) *Attorney, Agent, or Firm* — Baker Botts L.L.P.

(57) ABSTRACT

An aircraft and method of operating an aircraft. The aircraft includes a temperature sensor and a processor. The temperature sensor that obtains an optical signal indicative of a temperature at a selected location of an outer surface of the aircraft. The processor is configured to determine the temperature at the selected location from the optical signal, and operate the aircraft based on the temperature at the selected location.

14 Claims, 5 Drawing Sheets

ACTIVE INFRARED PREDICTION UTILIZING FIBER OPTIC NETWORK

BACKGROUND

The embodiments disclosed herein relate to a system and method for operating an aircraft and, in particular, to a system and method for sensing a temperature of outer surfaces of the aircraft and controlling operation of the operating the aircraft based on the sensed temperature.

Operation of an aircraft has an impact on a temperature of outer surfaces of the aircraft, also known as the skin of the aircraft. Exceedingly hot skin temperatures can affect an operation of the aircraft. Also, the skin temperature results in an infrared signal for the aircraft, which affects the detectability of the aircraft. Therefore, there is a benefit to being able to monitor and control the skin temperature of the aircraft during flight.

BRIEF DESCRIPTION

According to an embodiment, a method of operating an aircraft is disclosed. An optical signal is obtained, the optical signal being indicative of a temperature at a selected location of an outer surface of the aircraft. The temperature at the selected location is determined from the optical signal. The aircraft is operated based on the temperature at the selected location.

In addition to one or more of the features described above, the method further includes transmitting the optical signal through a fiber optic link disposed at the selected location, determining a change in a parameter of the optical signal due to the temperature at the selected location, and determining the temperature at the selected location from the change in the parameter of the optical signal.

In addition to one or more of the features described above, the fiber optic link is one of a plurality of fiber optic links forming a network at the selected location.

In addition to one or more of the features described above, operating the aircraft further comprises flying the aircraft to mask an infrared signal of the aircraft related to the temperature.

In addition to one or more of the features described above, the method further includes masking the infrared signal by determining an ambient temperature of an environment of the aircraft and operating the aircraft to match the temperature at the selected location to the ambient temperature.

In addition to one or more of the features described above, the method further includes adjusting an operation of the aircraft to reduce the temperature at the selected location.

In addition to one or more of the features described above, the method further includes comparing the temperature to a temperature threshold and adjusting the operation when the temperature exceeds the temperature threshold.

In addition to one or more of the features described above, the aircraft is one of a fixed wing aircraft, and a rotary wing aircraft.

According to another embodiment, an aircraft is disclosed. The aircraft includes a temperature sensor and a processor. The temperature sensor that obtains an optical signal indicative of a temperature at a selected location of an outer surface of the aircraft. The processor is configured to determine the temperature at the selected location from the optical signal, and operate the aircraft based on the temperature at the selected location.

In addition to one or more of the features described above, the temperature sensor includes a fiber optic link disposed at the selected location and an optical interrogator configured to transmit the optical signal through the fiber optic link and determine a change in a parameter of the optical signal due to the temperature at the selected location, and the processor is further configured to determine the temperature at the selected location from the change in the parameter of the optical signal.

In addition to one or more of the features described above, the fiber optic link is one of a plurality of fiber optic links forming a network at the selected location.

In addition to one or more of the features described above, the processor is further configured to fly the aircraft to mask an infrared signal of the aircraft related to the temperature.

In addition to one or more of the features described above, the processor is further configured to mask the infrared signal by determining an ambient temperature of an environment of the aircraft and operating the aircraft to match the temperature at the selected location to the ambient temperature.

In addition to one or more of the features described above, the processor is further configured to adjust an operation of the aircraft to reduce a temperature at the selected location.

In addition to one or more of the features described above, the processor is further configured to compare the temperature to a temperature threshold and adjust the operation when the temperature exceeds the temperature threshold.

In addition to one or more of the features described above, or as an alternative, in further embodiments

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
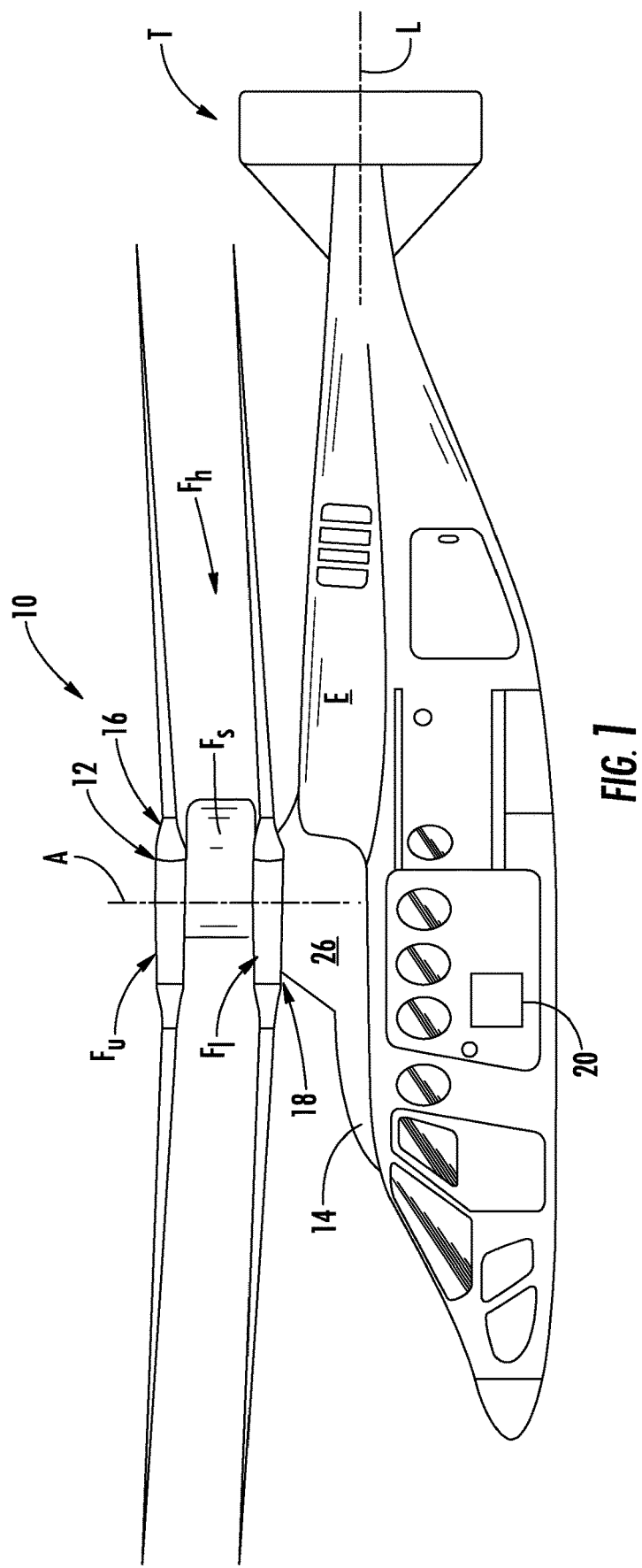
FIG. 1 illustrates an exemplary vertical takeoff and landing (VTOL) rotary-wing aircraft having a dual, counter-rotating, coaxial rotor system.

FIG. 1 illustrates an exemplary vertical takeoff and landing (VTOL) rotary-wing aircraft 10 having a dual, counter-rotating, coaxial rotor system 12 which rotates about an axis of rotation A. While discussed herein with respect to a VTOL rotary-wing aircraft 10, the system and methods disclosed herein can apply to any suitable aircraft or vehicle, including, but not limited to, rotary aircraft and fixed wing aircraft. The aircraft 10 of FIG. 1 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems will also benefit from the present invention. In various embodiments, the aircraft can be a fixed wing aircraft.

A main gearbox 26, which may be located above the aircraft cabin, drives the coaxial rotor system 12. The translational thrust system T may be driven by the same main gearbox 26 which drives the coaxial rotor system 12. The main gearbox 26 is driven by one or more engines (illustrated schematically at E). As shown, the main gearbox 26 may be interposed between the gas turbine engines E, the coaxial rotor system 12 and the translational thrust system T.

Outer surfaces of the aircraft form a skin of the aircraft. The skin of the aircraft can change temperatures due to ambient temperature, engine exhaust, etc. The aircraft 10 includes a temperature sensor 20 that monitors the temperature of the skin of the aircraft. The temperature sensor can include an optical system that includes a network of fiber optic links extending over at least a selected area of the aircraft, as discussed below.

Figure 2:
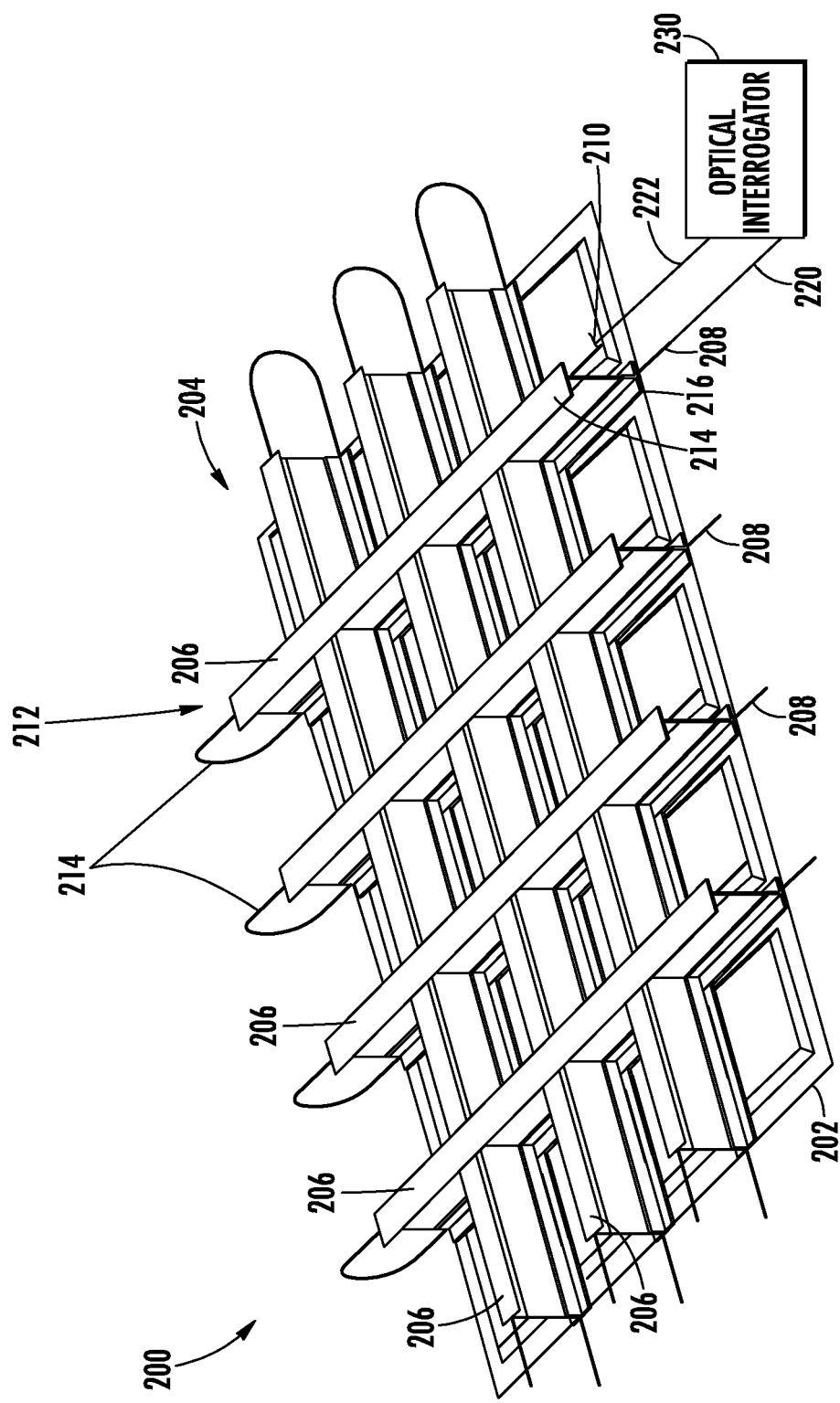
FIG. 2 shows a skin structure of the aircraft including an embedded fiber optic sensing system suitable for determining a temperature at the at selected location of the skin of the aircraft, in an embodiment.

FIG. 2 shows a skin structure 200 of the aircraft including an embedded fiber optic sensing system suitable for determining a temperature at the at selected location of the skin of the aircraft, in an embodiment. The skin structure includes a skin or outer surface 202 of the aircraft. A mesh 204 is formed on or affixed to the outer surface 202. The mesh 204 includes a plurality of interconnected support beams 206 that cover a selected area of the outer surface 202. A support beam includes a fiber optic link 208 that traverses a length of the support beam. As shown in FIG. 2, the support beam 206 is an I-beam. The fiber optic link 208 extends from a first end 210 of the I-beam to second end 212 of the I-beam through a first flange 214 of the I-beam, forms a loop 218 at the second end 212 and extends from the second end 212 to the first end 210 through a second flange 216 of the I-beam. Each fiber optic link 208 incudes a receiving end 220 and a delivery end 222, both of which are in optical communication with an optical interrogator 230. The mesh 204 of fiber optic links 208 form a fiber optic network over a selected area of the skin. The configuration of fiber optic links shown in FIG. 2 is an illustrative configuration that is not meant to be a limitation on the invention.

To measure a temperature at the selected location, the optical interrogator 230 transmits an optical signal into the fiber optic link 208 at the receiving end 220 and receives the optical signal from the fiber optic link 208 at the delivery end 222. As the optical signal propagates through the fiber optic link 208, temperature-induced strains on the fiber optic link cause a change in a parameter of the optical signal, such as its wavelength or frequency. In various embodiments, the fiber optic link 208 can include a sensor therein, such as a Fiber Bragg grating, that generates a change in a frequency of the optical signal when the sensor is lengthened or shortened due to temperature changes. Such changes can be detected at the optical interrogator 230 and be used to determine the stresses on the fiber optic link 208 and hence the temperature of the skin proximate fiber optic link 208. Performing this operation over the plurality of optical links of the mesh 204 allows a measurement of the temperature over the selected area of the skin.

Figure 3:
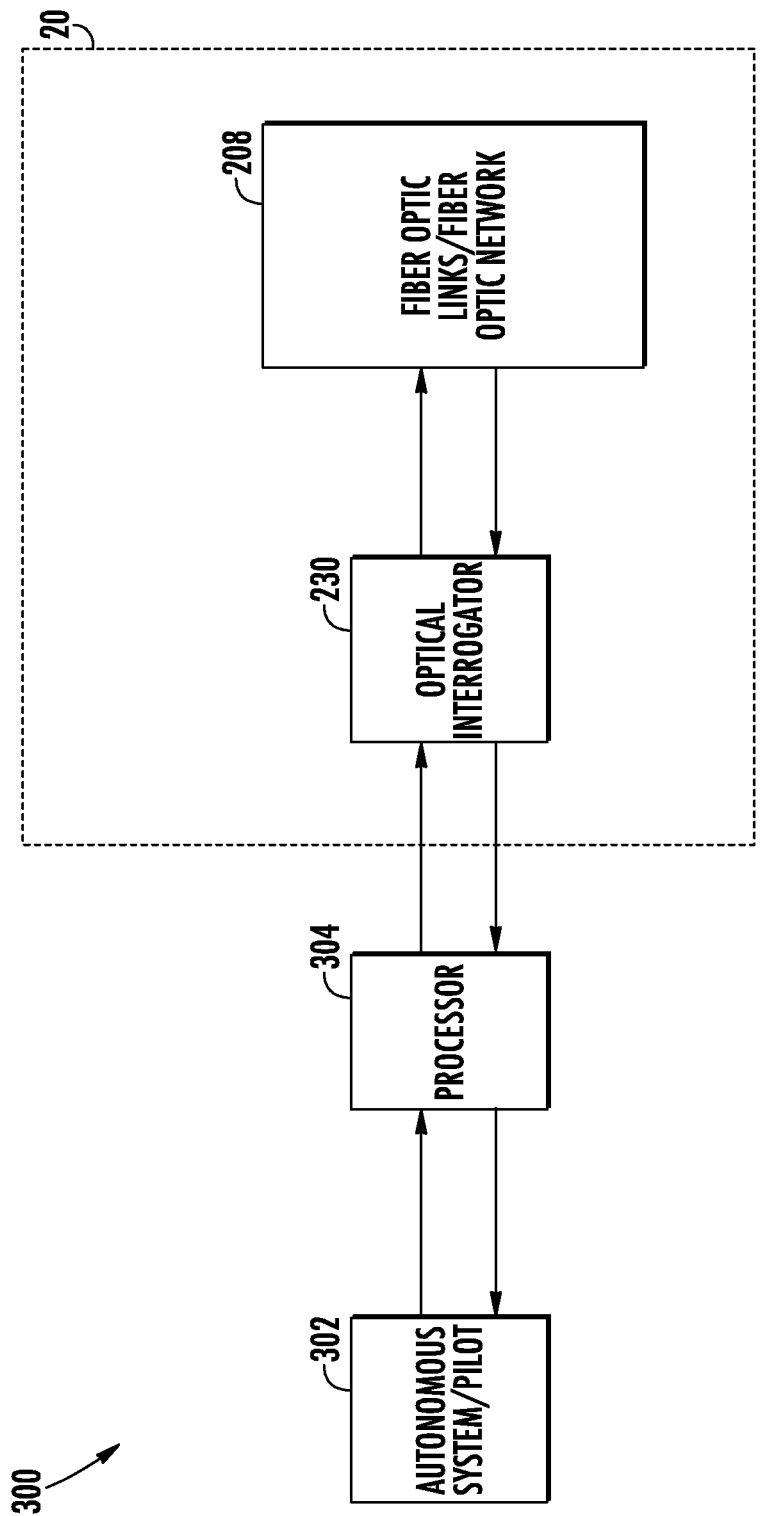
FIG. 3 shows a system for operating the aircraft based on a temperature at the skin of the aircraft.

FIG. 3 shows a system 300 for operating the aircraft 10 based on a temperature at the skin of the aircraft. The system 300 includes an autonomous controller 302 or pilot for the aircraft, a processor 304 and the temperature sensor 20, including the optical interrogator 230 and the fiber optic links 208 affixed to the outer surface 202 of the aircraft.

The processor 304 controls the optical interrogator 230 to inquire about the temperature of the skin by transmitting optical signals through the fiber optic links 208. The optical interrogator 230 transmits laser light or monochromatic light through the fiber optic links 208 in either a continuous wave or in a pulsed manner and receives the light upon its traversal of the fiber optic links 208. The optical interrogator 230 records changes in the parameter of the light such as a time delay or a frequency shift caused by thermal expansion or contraction of the fiber optic links 208 and provides such parameter changes to the processor 304. The processor 304 determines a temperature at a selected area of the skin from the change in the parameter of the optical signal. The temperature and the area or location of the temperature at the aircraft is provided to the autonomous controller 302. The autonomous controller 302 can adjust an operation of the aircraft based on the temperature and the location, as discussed with respect to FIG. 5. Alternatively, the temperature and the location of the temperature can be provided to a pilot who can make necessary adjustments to the operation of the aircraft based on the temperature. Additionally, the skin temperature and location can be recorded for later review during further design stages of the aircraft.

Figure 4:
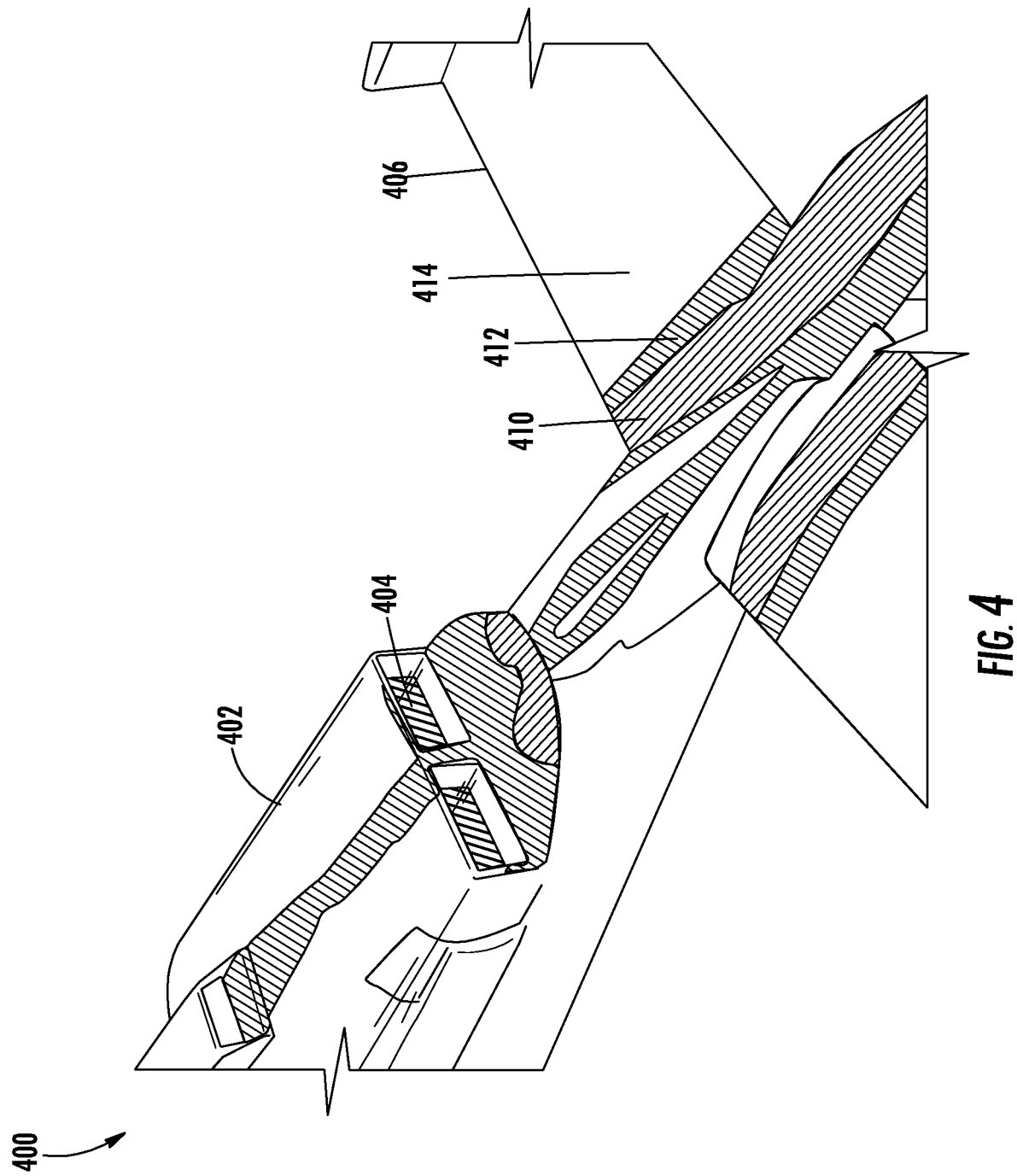
FIG. 4 shows an illustrative section of an aircraft.

FIG. 4 shows an illustrative section 400 of an aircraft. The section 400 includes an engine casing 402 and exhaust 404. The air from the exhaust flows of a rear section 406 of the aircraft producing different temperature regions. For illustrative purposes, a high temperature region 410 is shown directly behind the exhaust 404. To the side of the high temperature region 410 resides a medium temperature region 412. Further outside lies a low temperature region 414 that is relatively unaffected by the exhaust. Such temperature differentials can cause in-flight strains on the aircraft which can affect the operation of the aircraft or result in material failure of aircraft components.

Figure 5:
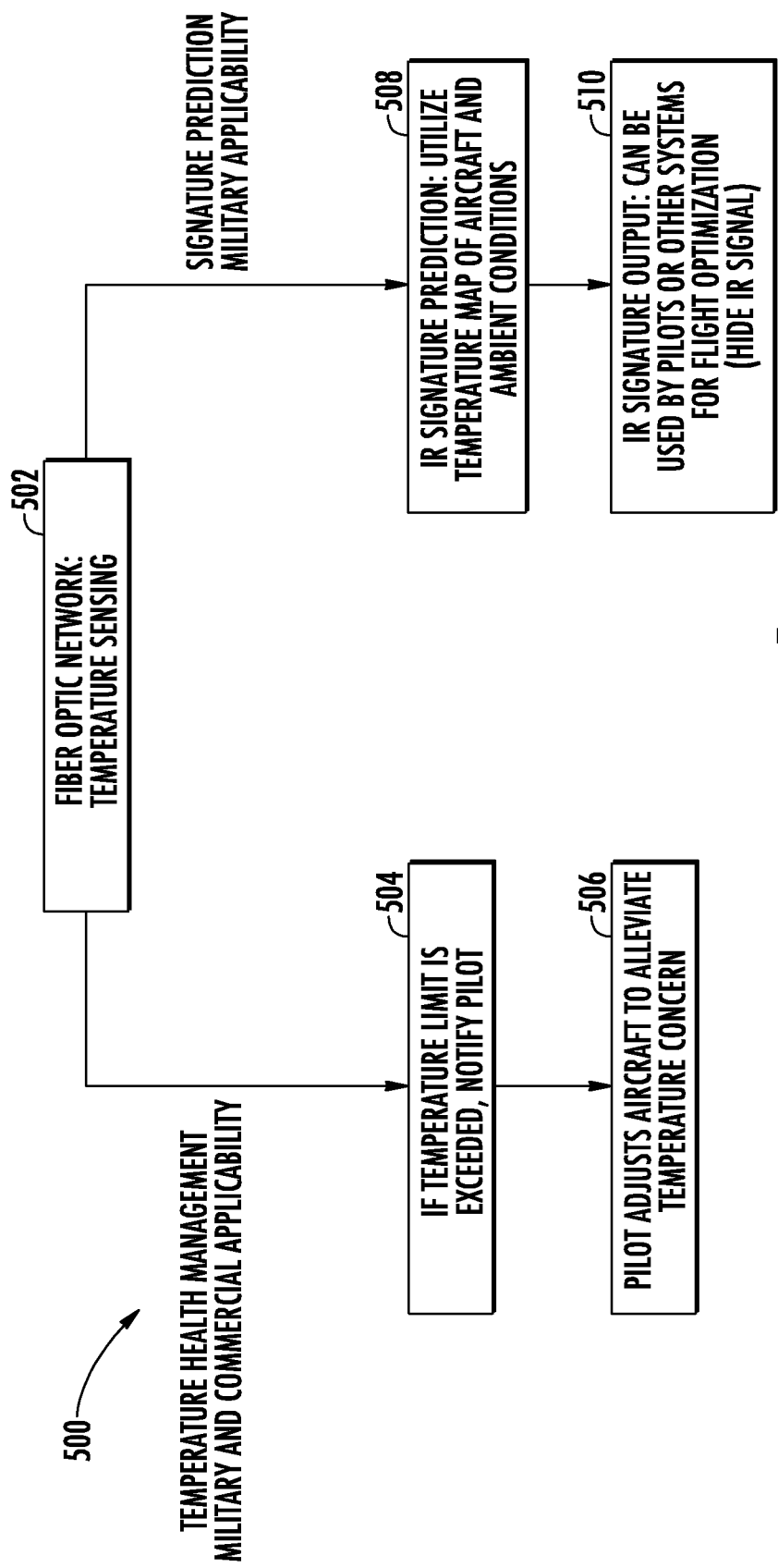
FIG. 5 shows a flowchart of various operations that can be performed at the aircraft based on skin temperature measurements.

FIG. 5 shows a flowchart 500 of various operations that can be performed at the aircraft based on skin temperature measurements. In box 502, the temperature measurements are obtained via the fiber optic network and fiber optic links 208, optical interrogator 230 and processor 304. In one embodiment, the temperature measurements can be used to maintain a health of the aircraft as discussed in boxes 504 and 506. In box 404, the temperature measurements are compared to a temperature threshold. When the temperature measurements exceed the temperature threshold, then in box 506 the pilot or autonomous controller 302 performs operations to lower the temperature of the aircraft or of the selected area of the skin of the aircraft. For example, if a temperature at the exhaust exceeds the temperature threshold, then the aircraft can be operated at a lower speed or a pitch of the aircraft can be changed in order to reduce the exhaust temperature.

In another embodiment, the temperature measurements can be used to dictate an in-flight operation at the aircraft, as discussed in boxes 508 and 510. In box 508, a temperature map of the aircraft can be compared to ambient conditions or ambient temperatures. In box 510, the pilot or autonomous controller can operate the aircraft in order to optimize flight based on these temperatures. An ambient temperature of the aircraft can be measured by a suitable temperature sensor and the aircraft can be operated in order to match a temperature of the skin of the aircraft with the ambient temperature, thereby masking or hiding an infrared signal of the aircraft within an infrared signal of the environment.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an aircraft, comprising:
   obtaining an optical signal from a fiber optic link of a temperature sensing system affixed on the outer surface of the aircraft, wherein the temperature sensing system comprises a mesh affixed to at least a portion of the outer surface of the aircraft, wherein the mesh comprises the fiber optic link disposed at a selected location, wherein the mesh further comprises a plurality of interconnected support beams, wherein each support beam of the plurality of interconnected support beams comprises a corresponding fiber optic link of the plurality of fiber optic links;
   determining, based at least in part on a change in a parameter of the optical signal, the temperature at the selected location; and
   operating the aircraft based at least in part on the temperature at the selected location.

2. The method of claim 1, further comprising:
   transmitting the optical signal through the fiber optic link disposed at the selected location;
   determining the change in the parameter of the optical signal due to the temperature at the selected location; and
   determining the temperature at the selected location from the change in the parameter of the optical signal.

3. The method of claim 2, wherein the fiber optic link is one of a plurality of fiber optic links forming a network at the selected location.

4. The method of claim 1, wherein operating the aircraft further comprises flying the aircraft to mask an infrared signal of the aircraft related to the temperature.

5. The method of claim 4, further comprising masking the infrared signal by determining an ambient temperature of an environment of the aircraft and operating the aircraft to match the temperature at the selected location to the ambient temperature.

6. The method of claim 1, further comprising adjusting an operation of the aircraft to reduce the temperature at the selected location.

7. The method of claim 6, further comprising comparing the temperature to a temperature threshold and adjusting the operation when the temperature exceeds the temperature threshold.

8. The method of claim 1, wherein the aircraft is one of: (i) a fixed wing aircraft; and (ii) a rotary wing aircraft.

9. An aircraft, comprising:
   an temperature sensing system affixed on the outer surface of the aircraft, the temperature sensing system comprising: a mesh affixed to at least a portion of the outer surface of the aircraft, the mesh comprising a plurality of fiber optic links, wherein each fiber optic link is associated with a selected location on the outer surface of the aircraft, wherein the mesh further comprises a plurality of interconnected support beams, wherein each support beam of the plurality of interconnected support beams comprises a corresponding fiber optic link of the plurality of fiber optic links and an optical interrogator configured to transmit an optical signal through each of the plurality of fiber optic links and determine a change in a parameter of the optical signal due to a temperature at the selected location associated with the corresponding fiber optic link; and
   a processor configured to:
      determine, based at least in part on the change in the parameter of the optical signal determined for each of the fiber optic links, the temperature of at least one of the selected locations; and
      operate the aircraft based at least in part on the temperature of at the at least one of the selected locations.

10. The aircraft of claim 9, wherein the plurality of fiber optic links form a network at the selected locations.

11. The aircraft of claim 9, wherein the processor is further configured to adjust an operation of the aircraft to reduce the temperature of at least one of the selected locations.

12. The aircraft of claim 11, wherein the processor is further configured to compare the temperature of at least one of the selected locations to a temperature threshold and adjust the operation when the temperature of at least one of the selected locations exceeds the temperature threshold.

13. The aircraft of claim 9, wherein the fiber optic link of each support beam extends from a first end of the support beam to a second end of the support beam, forms a loop at the second end of the support beam, and extends back from the second end of the support beam to the first end of the support beam.

14. The aircraft of claim 9, wherein each fiber optic link comprises a receiving end and a delivery end, wherein both the receiving end and the delivery end are in communication with the optical interrogator.

* * * * *